Sept. 29, 1942.   A. FRIEDRICH   2,297,400
DRIVING MECHANISM FOR AIR PROPELLERS
Filed Nov. 4, 1939
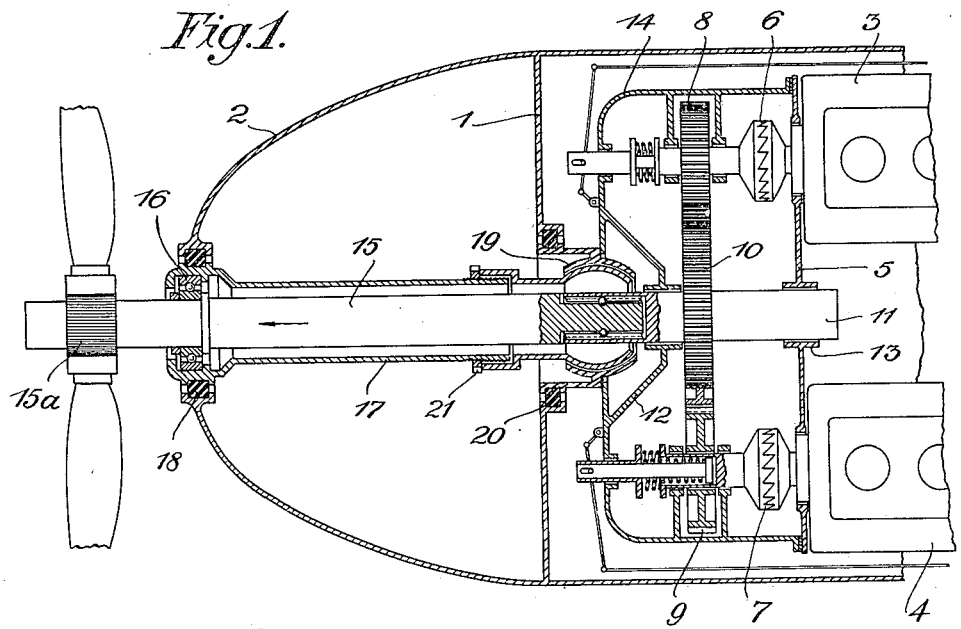
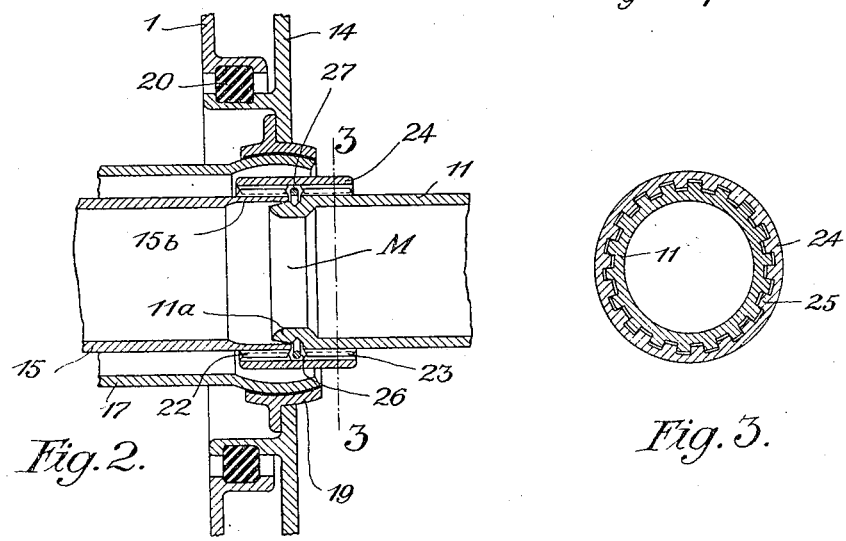
Albert Friedrich
INVENTOR
BY
ATTORNEY.

Patented Sept. 29, 1942

2,297,400

UNITED STATES PATENT OFFICE 2,297,400

DRIVING MECHANISM FOR AIR PROPELLERS

Albert Friedrich, Stuttgart-Bad-Cannstatt, Germany; vested in the Alien Property Custodian Application November 4, 1939, Serial No. 302,869
In Germany October 24, 1938

6 Claims. (Cl. 64—1)

The invention relates to the driving of air propeller shafts or the like for air crafts, particularly by a multiplicity of motors, whereby the driven shaft is swingingly coupled at one end with the driving shaft mechanism.

The invention consist therein, that the swinging end of the air propeller shaft is yieldingly supported in the fixed part of an air craft cellule, e. g. in the hull body. The end of the air propeller shaft coupled to the driving shaft mechanism therefore takes only up the rotating forces, whilst the other swingingly supported end of the said shaft takes up the shearing forces. For this purpose the swingingly supported end is supported in a sliding tube surrounding the said shaft by means of a collar bearing or the like, which tube is yieldingly supported with one end in the air craft cellule and with its other end hangs swingingly, but not axially movably on a fixed part of the driving mechanism. Further the last mentioned sliding tube end is, in a suitable manner, at the same time as the driving mechanism, hung up in a fixed part of the air craft cellule. If the driving shaft mechanism is driven by more motors, then the same is provided with a common driving gear wheel and is in a suitable manner at both sides of the said driving gear wheel supported in the driving casing. The swinging bearing for the air propeller shaft and the sliding tube are advantageously mounted directly before the driving shaft laying at the same level as the driving gear wheel of the shaft and further the length of the sliding tube as well as the total length of the air propeller and driving gear element bearing the swinging bearing of the sliding tube is supported in a known manner and the casing of the common driving mechanism serves as support for the sliding tube swinging bearing, forming the driving motor into one single element.

Over the known air propeller driving mechanisms with an air propeller shaft coupled with one end to the driving shaft and the multiple motor driving, the arrangement according to the invention has the advantage that the shaft needs only to be hingedly supported at one end and therefore the otherwise needed double support of the shaft at the other end is superfluous.

Particularly the thin-walled hull lining or other in a certain direction weak construction parts are free from the tensile and shearing strains as well as from the impulses in the length and transverse direction, and these strains and impulses are transferred to such constructional part which may resist the said strains. Further a free driving is assured in spite of the application of yieldingly mounted motors or a yieldingly mounted motor and driving element or in itself yielding construction elements serving for bearing the air propeller shaft also when large deformations or strong swinging movement of the yieldingly mounted driving mechanism will take place.

In the drawing a diagrammatical form of execution according to the invention is shown.

Fig. 1 is a multiple motor driving mechanism for an air propeller shaft in length sectional view.

Fig. 2 is a similar sectional view of the connection of the air propeller shaft consisting of two parts, and Fig. 3 is a cross sectional view along the line III—III of Fig. 2.

Figs. 2 and 3 are drawn on a larger scale than Fig. 1.

In the chosen form of execution two motors 3 and 4 mounted parallel side by side are mounted in a hull body 2 strengthened by a transverse frame 1. Both motors are connected at their front end by a strengthening plate 5 and drive by a claw clutch 6, 7 and a tooth gear 8, 9, 10 a common, central shaft 11. At 12 and 13 the shaft is supported not swingingly at both sides of the gear wheel 10, and these two bearings 12 and 13 belong to the driving gear casing 5, 14. The proper air propeller shaft 15 is hingedly coupled to the front end of the shaft, preferably in the neighbourhood of the bearing 12 and the relative end of the air propeller shaft 15 bears freely upon the articulated joint. The end 15a of the shaft 15 is also supported in a non-elastic bearing 16, taking up as well the axial tensile and shearing strains of the shaft 15 as its radial pressions. The bearing 16 is mounted in a particular sliding tube 17, bearing yieldingly e. g. by a rubber ring 18 upon the lining 2 of the hull body or upon a support. The other end of the sliding tube 17 is ball-shaped and bears in a link bearing 19 of the lid 14 of the driving gear casing. The said bearing 19 is in a suitable manner yieldingly supported by the transverse frame 1 e. g. by a rubber ring 20. The tube 17 consists in two parts and the total length of these two parts may be adjusted on the determined length by means of screw thread or by an adjusting ring 21. The length of the bearing of the shaft 15 is also adjustable in its hinging point. According to Fig. 2 a simple cam gear with a small clearance suffices, which clearance allows within certain limits a swinging movement of the air propeller shaft, whilst the shaft 11 lays quiet. In this manner an exact engagement of the gear wheel 10 is assured.

Particularly advantageous is, however, a shaft coupling as appears from Figs. 2 and 3. From this form of execution it appears that the end of the air propeller shaft directed to the connection point is at 15b cylindrically recessed and the end of the shaft 11 has a ball-shaped end 11a with smaller diameter fitting exactly with its largest outer diameter into the part 15b and ensures in this manner a position of both shafts 11 and 15 on the same level.

About the length of the recess 15b the end of the air propeller shaft 15 is provided with a tooth gear 22 and the end of the shaft 11 has a similar tooth gear 23 behind the smaller part 11a. Around both gears 22 and 23 is pushed a coupling ring 24 with a suitable inner gear 25 (Fig. 3). The gear 25 of the coupling ring has a ring shaped groove 26 containing a spring ring 27. The spring ring 27 prevents an axial displacement of the coupling ring 24 with respect to the tooth gears 22 and 23. Between the gear 25 of the coupling ring and the gears 22, 23 exists a slight clearance, allowing a swinging movement of the shaft 15 about the ball-shaped smaller part 11a of the shaft 11, so far as the elasticity of the yielding support 18 permits. The swinging movement of the air propeller shaft 15 takes place about a centre M, being at the same time the centre for the radius of curvature of the swing bearing 19.

By the invention, particularly by the described support of the sliding tube resp. the air propeller shaft, is attained that during swingings of the yieldingly supported driving unit the air propeller shaft together with the sliding tube may give way about the centre M of the swing bearing 19 and prevents that clamping forces will seize the air propeller shaft. The rubber bearing 18 prevents at the same time an undamped transfer of the vibrations and impulses to the relative weak hull linings or supports. At the same time the yielding support 18 enables, however, an axial deflection of the sliding tube 17, for instance in the direction of the arrow in Fig. 1, so that this sliding tube 17 transfers the shearing forces transmitted from the fixed bearing 16 to the tube 17 to the swing bearing 19, where the same will be taken up by the driving casing 14, 5 and the motor unit 3, 4, without stressing the hull 2 and the transverse frame 1 in a dangerous manner. By a relative adjustment of the sliding tube length by means of the adjusting ring 21 a certain pretension can be given to the elastic bearing ring 18 in a direction opposite the arrow in Fig. 1, so that the bearing ring and with the latter also the front part of the hull body get a corresponding discharge when shearing tensions occur in the arrow direction.

What I claim is:

1. An arrangement for supporting a propeller shaft in a fuselage or the like, said arrangement comprising a mounting universally articulated in the fuselage, a bearing for the propeller shaft carried by said mounting and an elastic element supporting said bearing in the fuselage.

2. An arrangement for supporting a propeller shaft in a fuselage or the like, said arrangement comprising an elongated member extending substantially in the direction of the propeller axis and including a bearing for the propeller shaft, an elastic element supporting one end of said member in the fuselage, and a universally articulated mounting for the other end of said member.

3. An arrangement, as claimed in claim 2, including means for elastically supporting said articulated mounting on the fuselage.

4. In an assembly comprising a fuselage, a driving shaft mounted in said fuselage, and a propeller shaft, the combination of an elongated tubular member surrounding and enclosing the propeller shaft and including a bearing for the latter, an elastic mounting for one end of said member in the fuselage, a universally articulated mounting for the other end of said member, and an articulated universal joint between said propeller shaft and said driving shaft.

5. In an assembly comprising a fuselage, a driving shaft mounted in said fuselage, and a propeller shaft, the combination of an elongated member extending substantially in the direction of the propeller axis and including a bearing for the propeller shaft, an elastic mounting for one end of said member in the fuselage, a universally articulated mounting for the other end of said member, and an articulated universal joint between said propeller shaft and said driving shaft, said articulated mounting and said articulated joint having a common pivot center.

6. In an assembly comprising a fuselage, a driving shaft mounted in said fuselage, and a propeller shaft, the combination of an elongated member of variable length extending substantially in the direction of the propeller axis and including a bearing for the propeller shaft, an elastic mounting for one end of said member in the fuselage, a universally articulated mounting for the other end of said member, an articulated universal joint between said propeller shaft and said driving shaft, said joint being adapted to permit a limited axial displacement of said propeller shaft relative to said driving shaft, and means for adjusting the length of said elongated member to give to said elastic mounting a desired initial tension.

ALBERT FRIEDRICH.